Figure 1:
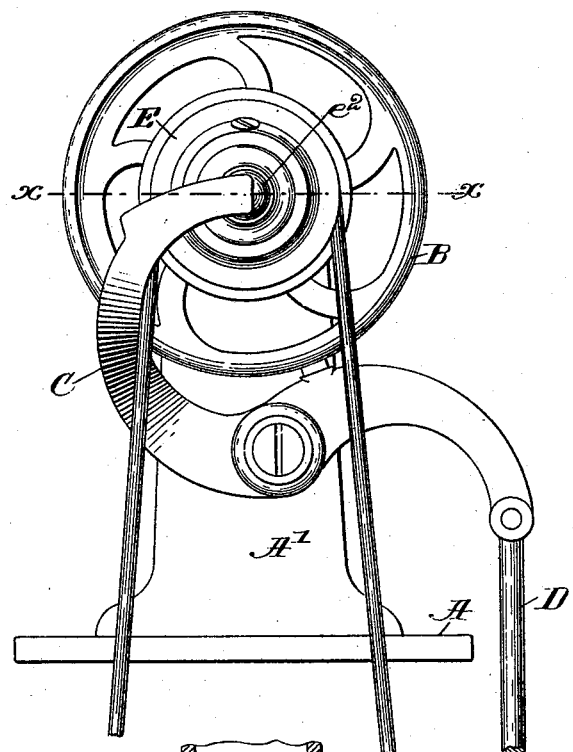

(No Model.)

G. H. DIMOND & W. F. DIAL.
FRICTION DRIVING PULLEY FOR SEWING MACHINES.

No. 588,963. Patented Aug. 31, 1897.

Witnesses:
A. C. Harmon.
Thomas J. Drummond.

Inventors:
George H. Dimond.
Wilbur F. Dial.
by Crosby & Gregory
Attys.

THE NORRIS PETERS CO., PHOTO-LITHO., WASHINGTON, D. C.

UNITED STATES PATENT OFFICE.

GEORGE H. DIMOND AND WILBUR F. DIAL, OF BRIDGEPORT, CONNECTICUT, ASSIGNORS TO THE WHEELER & WILSON MANUFACTURING COMPANY, OF SAME PLACE.

FRICTION DRIVING-PULLEY FOR SEWING-MACHINES.

SPECIFICATION forming part of Letters Patent No. 588,963, dated August 31, 1897.

Application filed February 2, 1897. Serial No. 621,679. (No model.)

*To all whom it may concern:*

Be it known that we, GEORGE H. DIMOND and WILBUR F. DIAL, of Bridgeport, in the county of Fairfield and State of Connecticut, have invented an Improvement in Friction Driving-Pulleys for Sewing-Machines, &c., of which the following description, in connection with the accompanying drawings, is a specification, like letters on the drawings representing like parts.

This invention has for its object to place a main shaft of a sewing-machine under the control of a friction clutch-pulley mounted thereon, said pulley being composed of two parts, one of which is fixed on said shaft, while the other part is free to be rotated continuously, the continuously-rotating parts being adapted at desired times to engage frictionally and rotate with it the part of said pulley fixed to said main shaft, and consequently rotate the main shaft.

Our invention is intended as an improvement on the apparatus shown in United States Patent No. 391,694, dated October 23, 1888.

In this our present invention, to enable the shaft and the pulley to be rotated with the minimum of friction, we have provided the friction-pulley with thrust-bearings containing antifriction-rolls, one of said thrust-bearings being connected with the hub of the fast pulley, so as to be interposed between it and the head of the machine, while the other of said thrust-bearings is placed at the outer end of the continuously-moving part of said pulley, a large roll or ball being interposed between the smaller rolls of said thrust-bearing, and a pressure-lever by the movement of which the said pulley parts are forced firmly in contact, so that the continuously-moving driving-pulley will take and move with it the fast pulley and its shaft or will leave the said fast pulley and its shaft at rest, a brake connected with or forming part of said pressure-lever and controlled by the foot of the operator in usual manner being employed to engage the peripheries of and stop the rotation of the said fast pulley whenever the continuously-moving pulley is free from pressure against it.

Sewing-machines have not heretofore come generally into use wherein the main shaft carries a friction clutch-pulley, for the reason that the pressure required to force and hold the pulley parts in contact when the continuously-moving part is made operative to rotate the main shaft is so excessive as to add not only severely to the labor of the operator, but also to put such an amount of drag on the machine owing to the in thrust as to require a greatly-increased amount of power to run the machine, but by the interposition of the antifriction thrust-bearings, such as herein provided for, it becomes possible to put the friction clutch-pulley on the main shaft or head of the machine, where it may be easily controlled by the operator and without undue loss of power.

The antifriction thrust-bearing interposed between the fast pulley and the head of the machine has a loose sleeve provided with a flange, on one side of which the said rolls run, the said sleeve being extended from the said pulley into an annular chamber or recess in the machine-head surrounding the main shaft, said chamber receiving said sleeve when the fast pulley is secured to the main shaft, the said sleeve being of such length with relation to the depth of said chamber that it will bottom in the said chamber before the hub of the pulley and the head of the machine come in contact, and consequently said sleeve stands stationary and affords an annular support, upon which the rolls in said fast pulley run.

By employing a large ball between the beveled end of the swinging pressure-lever and the thrust-bearing in the outer end of the continuously-rotating pulley it is possible to always insure a right-line pressure on the said continuously-moving pulley when it is being pushed frictionally against the said fast pulley, said roller preventing any side thrust or pressure on the said pulley as the said pressure-lever is coming into operation.

Figure 2:
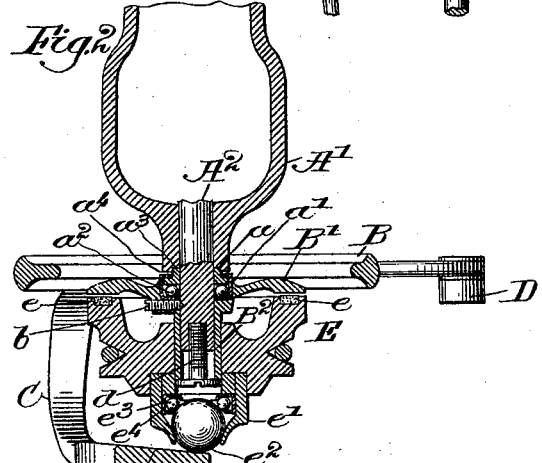
Figure 3:
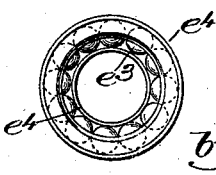

Figure 1 represents a sufficient portion of the rear end of a sewing-machine with our improvements added to enable our invention to be understood. Fig. 2 is a partial section in the line $x$, Fig. 1; and Fig. 3 is a detail of one of the thrust-bearings detached.

The bed-plate A and upright arm A', erected thereon, and the main shaft A² of the machine, partially shown in Fig. 2, and the pressure-lever C, having an inclined face at c and having connected to it a link D under the control of the foot of the operator, are and may be all substantially as shown in said patent.

The fast-pulley part B of the friction driving-pulley has a friction-face B' and an extended sleeve-hub B², and this pulley is made fast upon the main shaft by suitable set-screws, as b.

The upright portion A' of the sewing-machine, it constituting part of the head, has formed in it about the shaft A² a recess, (shown at a, Fig. 2,) and the inner face of the fast pulley B is chambered to receive an antifriction thrust-bearing, composed, essentially, of the cage a', containing a series of rolls a², the said cage being forced snugly into the said recess. Inside of this cage and surrounding the main shaft we have introduced a sleeve a³, it having a flange within the cage which acts against the rolls a², and to retain this sleeve in place we have forced inside the cage and between it and the shank of the sleeve a ring a⁴. The sleeve extends from the inner side of the fast pulley and enters the recess a in the head, it bottoming in said recess just before the ring a⁴ touches the head or upright A', said sleeve by its contact with the head being retained from rotation, but the fast pulley, also fixed to the shaft A², rotates freely, and the rolls turn on the flange of the sleeve. The fast pulley is further secured upon the main shaft by means of a set-screw d, inserted into the extended hub B² of the pulley and entering a tapped hole in the end of the shaft.

The continuously-rotating pulley E of the friction driving-pulley has a friction-face e, which when thrust against the face B' of the fast pulley rotates it with it, but when released enables the said pulley part E to be rotated and leave the main shaft and fast pulley at rest. The pulley part E runs loosely on the extension B² of the fast pulley, and at its outer end the said pulley is suitably chambered to receive a tip e', the said tip being circular and open at its end. This tip contains a large roll or ball e², which rests against a series of small rolls e³, held by a cage e⁴, forced into the tip, as best shown in Fig. 2.

Fig. 2 shows the pulley part E out of contact with the fast pulley, the latter rotating freely.

Now to cause the main shaft to be rotated the operator will, through his foot or otherwise, turn the pressure-lever C in the direction indicated by the arrow in Fig. 2, and the inclined face c, acting on the large ball e², will rotate it in contact, however, with the series of smaller rolls in the antifriction thrust-bearing part E and will force the said pulley part laterally upon the extension B² and force the leather or other material e closely against the fast pulley and rotate it with it. The rotation of the large ball e² prevents any side strain on the pulley E.

Prior to our invention we are not aware that a fast and a loose pulley employed together have ever both and each been provided with antifriction thrust-bearings.

We do not claim simply a ball-bearing composed of one large ball in contact with a series of small balls, as this is old.

Having fully described our invention, what we claim, and desire to secure by Letters Patent, is—

1. The main shaft and its attached fast pulley provided with an antifriction thrust-bearing interposed between said pulley and the bearing for the said shaft, combined with a pulley E adapted to be rotated continuously coincident with the said fast pulley and provided at its end with an antifriction thrust-bearing, a pressure-lever, and means between said pressure-lever and the thrust-bearing of the pulley E to effect a longitudinal right-line movement of the pulley E frictionally against the said fast pulley and axially of said main shaft, substantially as described.

2. The main shaft A², the fast pulley fixed thereto, and having an antifriction thrust-bearing interposed between one of its sides, and the bearing for the said main shaft, and a loose pulley adapted to be continuously rotated and provided at its outer side with an antifriction thrust-bearing, combined with a large ball supported by the balls of the thrust-bearing in the said loose pulley, a tip fixed on said loose pulley and embracing said thrust-bearing and also said large ball, and a pressure-lever acting upon said large ball, thereby to move said loose pulley into engagement with said fixed pulley, substantially as described.

3. The main shaft A², and its bearings, the latter having an annular chamber a at one end, and a sleeve fitted within said chamber, said sleeve having an outturned flange extending beyond said chamber, combined with a fast pulley secured to said shaft adjacent said end, and having an antifriction thrust-bearing to coöperate with said sleeve, said thrust-bearing comprising a plurality of balls between said pulley and said sleeve, and a cage secured to said pulley, inclosing said balls and overlapping said flange, substantially as described.

4. The main shaft, and its bearings, a fast pulley secured to said shaft, a loose pulley adjacent said fast pulley, a pressure-lever to move said loose pulley bodily to engage said fast pulley and drive said shaft, and an antifriction thrust-bearing comprising a plurality of small balls mounted on and carried by said loose pulley, said thrust-bearing having a large ball supported by said small balls axially of said pulleys and between said thrust-bearing and said lever, whereby the latter effects a right-line movement of the loose pulley longitudinally of said shaft, substantially as described.

5. The main shaft, and its bearings, the latter having an annular chamber at one end, and a sleeve fitted within said chamber, said sleeve having an outturned flange extending beyond said chamber, combined with a fast pulley secured to said shaft adjacent said end, and having an antifriction thrust-bearing to coöperate with said sleeve, said thrust-bearing comprising a plurality of balls between said pulley and said sleeve, and a cage inclosing said balls and overlapping said flange, substantially as described.

6. The main shaft, and its bearings, combined with a fast pulley on said shaft adjacent said bearings, an antifriction thrust-bearing, comprising a plurality of balls, between said pulley and said bearings, a sleeve between the latter and said balls, said sleeve having an outturned flange adjacent said balls, a cage inclosing said balls and overlapping said flange, and a ring secured to said cage and extending behind said flange, substantially as described.

7. The main shaft, and its bearings, combined with a fast pulley on said shaft adjacent said bearings, an antifriction thrust-bearing, comprising a plurality of balls, between said pulley and said bearings, a sleeve between the latter and said balls, and a cage inclosing said balls and overlapping said flange, substantially as described.

In testimony whereof we have signed our names to this specification in the presence of two subscribing witnesses.

GEORGE H. DIMOND.
WILBUR F. DIAL.

Witnesses:
ISAAC HOLDEN,
GEO. CORNWELL.